US010990603B1

(12) United States Patent
Macgillivray et al.

(10) Patent No.: US 10,990,603 B1
(45) Date of Patent: *Apr. 27, 2021

(54) SYSTEMS AND METHODS FOR GENERATING RESPONSES TO NATURAL LANGUAGE QUERIES

(71) Applicant: Google LLC, Mountain View, CA (US)

(72) Inventors: Ian Macgillivray, Brooklyn, NY (US); Engin Cinar Sahin, New York, NY (US); Emma Sarah Persky, New York, NY (US); Max Bogue, Seattle, WA (US); Angela Ni-Hwey Chang, New York, NY (US); Konrad Piotr Delong, Long Island City, NY (US)

(73) Assignee: GOOGLE LLC, Mountain View, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/280,626

(22) Filed: Feb. 20, 2019

Related U.S. Application Data

(63) Continuation of application No. 15/416,994, filed on Jan. 26, 2017, now Pat. No. 10,229,173, which is a (Continued)

(51) Int. Cl.
*G06F 17/30* (2006.01)
*G06F 16/248* (2019.01)
(Continued)

(52) U.S. Cl.
CPC ...... *G06F 16/248* (2019.01); *G06F 16/24522* (2019.01); *G06F 16/9024* (2019.01)

(58) Field of Classification Search
CPC ............. G06F 16/248; G06F 16/24522; G06F 16/9024
See application file for complete search history.

(56) References Cited

U.S. PATENT DOCUMENTS

| 7,668,813 B2 * | 2/2010 | Baeza-Yates ....... G06F 16/2477 707/769 |
| 7,680,783 B2 | 3/2010 | Ritter et al. |

(Continued)

OTHER PUBLICATIONS

Andriy Shepitsen et al. Personalized Recommendation is Social Tagging Systems Using Hierarchical Clustering (9 pages), RecSys '08, Oct. 23-25, 2008, Lausanne, Switzerland 2008.

*Primary Examiner* — Huawen A Peng
(74) *Attorney, Agent, or Firm* — Middleton Reutlinger

(57) ABSTRACT

Computer-implemented systems and methods are provided for analyzing and responding to a query from a user. Consistent with certain embodiments, systems and methods are provided for receiving a query from the user and dividing the query into query segments based on a set of grammar rules. Further, systems and methods are provided for selecting a first segment from the query segments, receiving at least one tuple stored in association with the user, selecting a second segment from the at least one tuple. Additionally, systems and methods are provided for receiving information related to the first and second segments, and generating a response to the query based on the received information. In addition, systems and methods are provided for transmitting information to a display device for presenting the response to the user.

16 Claims, 7 Drawing Sheets

Related U.S. Application Data continuation of application No. 14/338,819, filed on Jul. 23, 2014, now Pat. No. 9,589,060.

(51) Int. Cl.
  *G06F 16/2452* (2019.01)
  *G06F 16/901* (2019.01)

(56) References Cited

U.S. PATENT DOCUMENTS

| | | | |
|---|---|---|---|
| 8,086,028 | B2 | 12/2011 | Sproat |
| 8,126,892 | B2 * | 2/2012 | Chakravarthy ......... G06F 16/38 |
| | | | 707/736 |
| 8,281,290 | B2 | 10/2012 | Thompson |
| 8,726,142 | B2 | 5/2014 | Piantino et al. |
| 2008/0040321 | A1 | 2/2008 | Baeza-Yates |
| 2008/0104071 | A1 * | 5/2008 | Pragada ............ G06F 16/24522 |
| 2009/0012842 | A1 | 1/2009 | Srinivasan et al. |
| 2009/0234640 | A1 * | 9/2009 | Boegl .................... G06F 40/30 |
| | | | 704/9 |
| 2009/0327256 | A1 | 12/2009 | Paparizos et al. |
| 2011/0093479 | A1 * | 4/2011 | Fuchs .................... G06F 16/36 |
| | | | 707/755 |
| 2012/0254143 | A1 * | 10/2012 | Varma .................... G06F 40/30 |
| | | | 707/706 |
| 2013/0061121 | A1 | 3/2013 | Thomsen |
| 2014/0330818 | A1 | 11/2014 | Raina et al. |

* cited by examiner

SYSTEMS AND METHODS FOR GENERATING RESPONSES TO NATURAL LANGUAGE QUERIES

BACKGROUND

The ubiquitous nature of the Internet and the ease with which users can access the Internet from a variety of computer and communication devices has enabled users to share information and search for information related to their interests. For example, users may share or search for various types of information including, photographs, videos, music, blogs, messages, comments, and other information. A significant amount of information, however, still does not get recorded and/or shared because conventional ways for communicating and recording information can be cumbersome to use or implement.

Some devices and applications allow users to record and store certain specific types of information and receive summaries of the recorded information. For example, fitness and exercise tracking devices allow users to enter the types and amount of food items eaten every day, the amount of exercise performed, a weight loss, or calorie goal, etc. However, these devices can only store a limited amount of information. Furthermore, these devices cannot derive information from natural language declarations and text entry.

Other solutions require users to explicitly enter information in predetermined formats. In addition, some devices may provide users with a limited amount of feedback in the form of summary information generated from the information entered by the user and/or the limited information stored on these devices.

SUMMARY

This disclosure generally relates to systems and methods for aggregating information from natural language declarations provided by a user and for providing inferences based on that information. The information in the natural language declarations may be stored in the form of structured tuples. Segments of the tuples may be linked to knowledge graphs, social graphs, and/or entity graphs of structured information, which may be used to provide inferences and feedback to the user.

In accordance with one example embodiment, a computerized system is provided for analyzing and responding to a user query. The computerized system includes a memory device that stores a set of instructions and at least one processor that executes the set of instructions to receive a query from the user and divide the query into query segments based on a set of grammar rules. The at least one processor also executes the set of instructions to select a first segment from the query segments, receive at least one tuple stored in association with the user, and select a second segment from the at least one tuple. In addition, the at least one processor executes the set of instructions to receive information related to the first and second segments and generate a response to the query based on the received information.

In accordance with another example embodiment, a computer-implemented method is provided for analyzing and responding to a user query. The operations of the method include receiving a query from the user and dividing the query into query segments based on a set of grammar rules. The operations of the method also include selecting a first segment from the query segments, receiving at least one tuple stored in association with the user, and selecting a second segment from the at least one tuple. In addition, the operations of the method include receiving information related to the first and second segments, and generating a response to the query based on the received information.

In accordance with a still another example embodiment, a computer program product is provided that comprises executable instructions tangibly embodied in a non-transitory computer-readable medium. The instructions, when executed by one or more processors, cause the one or more processors to receive a query from the user and divide the query into query segments based on a set of grammar rules. The instructions also cause the one or more processors to select a first segment from the query segments, receive at least one tuple stored in association with the user, and select a second segment from the at least one tuple. In addition, the instructions cause the one or more processors to receive information related to the first and second segments, generate a response to the query based on the received information, and transmit information to a display device for displaying the response to the user.

In accordance with a still another example embodiment, a client device is provided that includes a memory device that stores a set of instructions, and at least one processor that executes the set of instructions to divide a query from a user into query segments based on a set of grammar rules. The at least one processor also executes the set of instructions to select a first segment from the query segments, receive at least one tuple stored in association with the user, and select a second segment from the at least one tuple. In addition, the at least one processor executes the set of instructions to receive information related to the first and second segments, and generate a response to the query based on the received information. The client device also includes a display device to display the response to the user.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which the disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION OF EXAMPLE EMBODIMENTS

Reference will now be made in detail to the present embodiments of the disclosure, certain examples of which are illustrated in the accompanying drawings.

This disclosure presents computer-implemented systems and methods for aggregating and storing information derived from natural language declarations made by users. The natural language declaration may be received from a user at a client device. In some embodiments, the systems and methods may evaluate the natural language declaration to identify data items based on a set of grammar rules (e.g., nouns, verbs, prepositions, adverbs, adjectives, subject, predicate, etc.). The systems and methods may combine the data items in one or more tuples and store the tuples in association with the user.

This disclosure also presents computer-implemented systems and methods for generating responses to a natural language query received from a user. The natural language query may be received from a user at a client device. In some embodiments, the systems and methods may evaluate the natural language declaration to identify query segments based on a set of grammar rules (e.g., nouns, verbs, subject, predicate, etc.). The systems and methods may access a knowledge graph to retrieve information related to one or more query segments and one or more data items associated with the user. The systems and methods may generate responses to the query based on the retrieved information.

Figure 1:
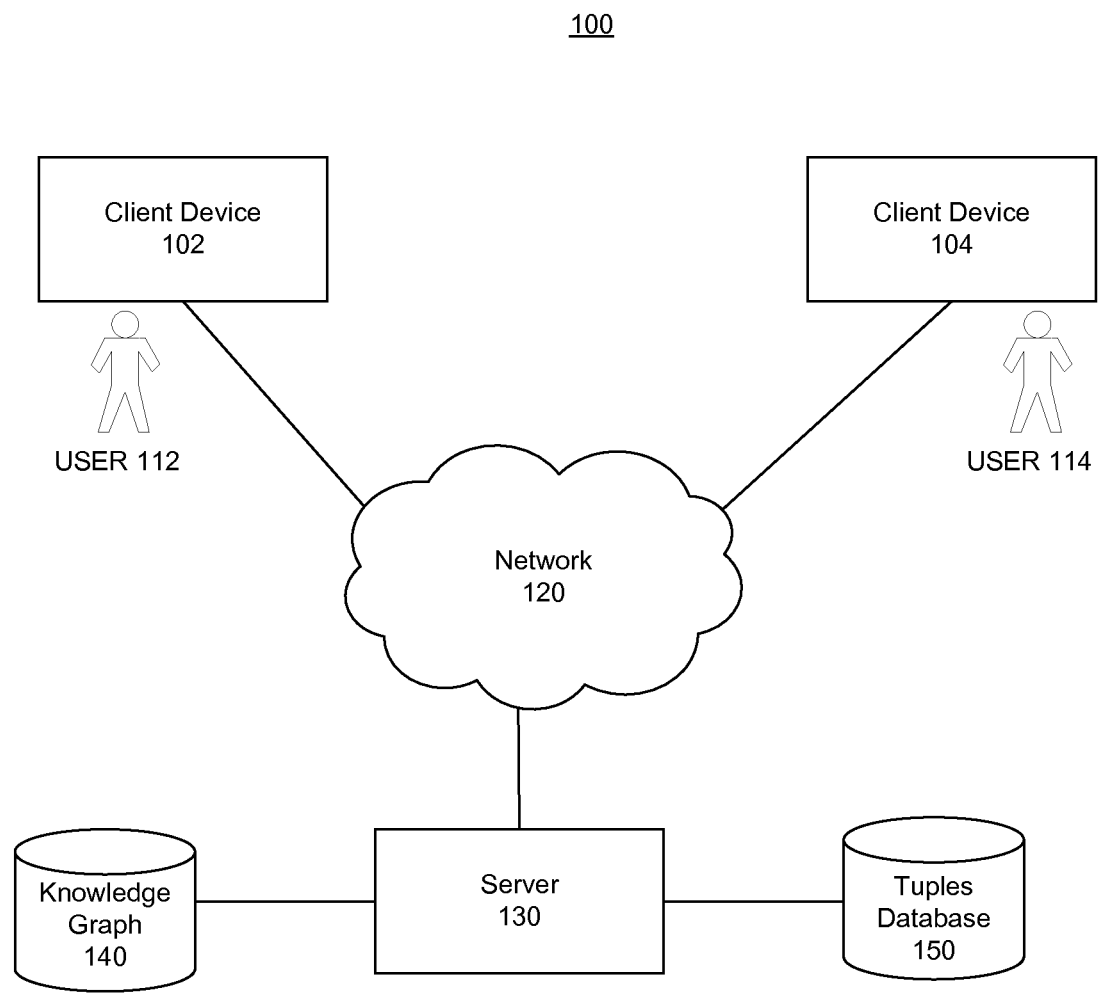
FIG. 1 illustrates an example system environment for implementing embodiments and features of the present disclosure.

FIG. 1 is a block diagram of an example system 100 for implementing embodiments and features of the present disclosure. The arrangement and number of components in system 100 is provided for purposes of illustration. Additional arrangements, number of components, and other modifications may be made, consistent with the present disclosure.

As shown in FIG. 1, system 100 may include one or more client devices 102, 104 that are owned or operated by one or more users 112, 114. By way of example, client devices 102, 104 may include smartphones, tablets, netbooks, electronic readers, personal digital assistants (PDAs), web enabled television sets, personal computers, laptop computers, desktop computers, and/or other types of electronics or communication devices. In certain embodiments, client devices 102, 104 may be implemented with hardware devices and/or software applications running thereon. In other embodiments, client devices 102, 104 may implement the disclosed embodiments and features without the need for accessing another device, component, or network, such as network 120. In some embodiments, server 130 may implement the disclosed embodiments and features without the need for accessing another device, component, or network 120. In yet other embodiments, client devices 102, 104 may be configured to communicate to and/or through network 120 with other clients and components, such as server 130, knowledge graph 140, and/or tuples database 140.

In certain embodiments, network 120 may include a combination of communications networks. For example, network 120 may include the Internet and/or any type of wide area network (WAN), an intranet, a metropolitan area network, a local area network (LAN), a wireless network, a cellular communications network, etc. In some embodiments, client devices 102, 104 may be configured to transmit information (e.g., a natural language declaration by the user or a natural language query based on input provided by users 112, 114) through network 120 to an appropriate server, such as, for example, server 130. In some embodiments, client devices 102, 104 may also be configured to receive information (e.g., responses to the natural language queries), in response to requests, from server 130 through network 120.

Server 130 may include one or more servers configured to communicate and interact with client devices 102, 104, network 120, knowledge graph 140, and/or tuples database 150. In some embodiments, server 130 may implement or provide one or more search engines, natural language interpretation and classification engines, sets of grammar rules, and/or applications or programs to receive and store natural language declarations and/or to generate responses to natural language queries. In one example embodiment, server 130 may be a special purpose computer configured to implement the embodiments of this disclosure. In another example embodiment, server 130 may be a general purpose computer, a mainframe computer, or any combination of these components. In certain embodiments, server 130 may be a standalone computing system or apparatus, or it may be part of a subsystem, which may be part of a larger system. For example, server 130 may represent remotely located and distributed servers that may communicate over a communications medium (e.g., network 120) or over a dedicated network, for example, a LAN or a WAN. In some embodiments, server 130 may be implemented as an independent computing device, a server system comprising a plurality of servers, or a server farm comprising a load balancing system and a plurality of servers.

Knowledge graph 140 may include one or more logically and/or physically separate databases configured to store data. The data stored in knowledge graph 140 may be received from servers 140, from client devices 102, 104 and/or may be provided as input using conventional methods (e.g., data entry, data transfer, data uploading, etc.). The data stored in the knowledge graph 140 may take or represent various forms including, but not limited to, documents, presentations, textual content, audio files, video files, information and data items stored in the form of tuples, grammar rules, and a variety of other electronic data, or any combination thereof. A knowledge graph item about any subject or data item may include a corpus of information and content items associated with the subject or data item. A corpus of information may include names, places, things, events, and/or content items. In some embodiments, the knowledge graph item may include links (for example, URL's) to the corpus of information. In other embodiments, the knowledge graph item may include references or links to other knowledge graph items and/or databases containing the corpus of information. By way of example, a knowledge graph item for a data item "banana" may include a corpus of information including varieties of banana, where banana is cultivated, pricing and availability of banana, nutritional content in a banana, recipes based on the use of banana, festivals or events associated with banana, etc. By way of another example, the knowledge graph item may include additional information such as the frequency with which users 112, 114 may have searched for information or posted comments regarding "banana," comments, messages, and/or blog posts regarding banana, etc. Based on this disclosure, it will be recognized that these are only examples and many other types of content items, including audio and video information, associated with the subject or data item may be included in the knowledge graph item.

Tuples database 140 may store, for example, information obtained from natural language declarations and social graphs of the user. The information may include documents, presentations, news items, articles, blog posts, books, book reviews, magazines, magazine articles, audio or video recordings, text messages, e-mail messages, social media content, or any other type of information authored by a user and/or the user's social media contacts or by preferred contacts identified by the user. The information may also include search logs containing search strings used by the user to search for content items and/or quotes. The information received from the user may be stored in tuples database 150 in the form of tuples associated with the user.

In some embodiments, knowledge graph 140 may be implemented using a single computer-readable storage medium. In other embodiments, knowledge graph 140 may be maintained in a network attached storage device, in a storage area network, or combinations thereof, etc. Furthermore, knowledge graph 140 may be maintained and queried using numerous types of database software and programming languages, for example, SQL, MySQL, IBM DB2®, Microsoft Access®, PERL, C/C++, Java®, etc. Although FIG. 1 shows knowledge graph associated with server 130, knowledge graph 140 may be a standalone database that may be accessible via network 120 or knowledge graph 140 may be associated with or provided as part of a system 100 or environment that may be accessible to client devices 102, 104 and/or other components.

Tuples database 150 may have a structure and function similar to knowledge graph 140 and may be maintained and queried in a manner similar to knowledge graph 140. In certain embodiments, system 100 may include only knowledge graph 140, which may perform functions of both knowledge graph 140 and tuples database 150. In other embodiments, system 100 may include only tuples database 150, which may perform functions of both knowledge graph 140 and tuples database 150.

In yet other embodiments, as illustrated in FIG. 1, system 100 may include both knowledge graph 140 and tuples database 150. Although FIG. 1 illustrates only one knowledge graph 140 and only one tuples database 150, system 100 may include any number of knowledge graphs 140, tuples databases 150, and/or any other databases.

Figure 2:
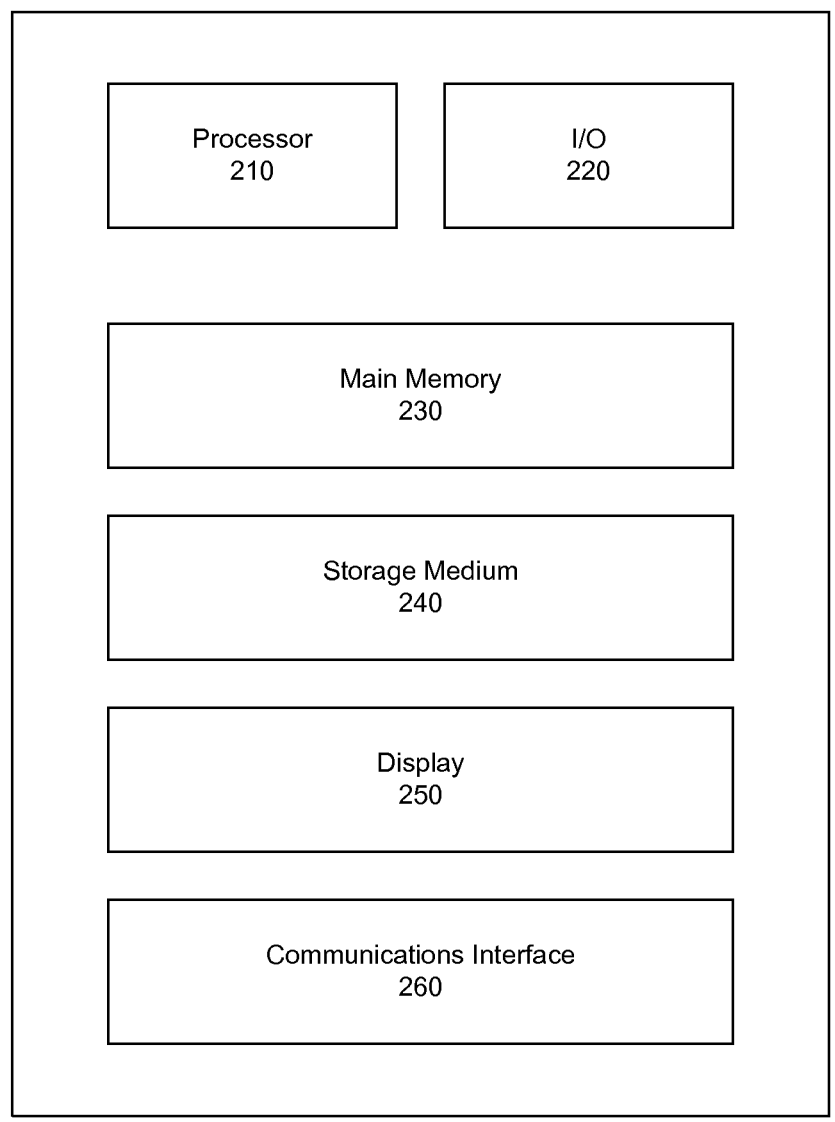
FIG. 2 illustrates an example electronic apparatus or system for implementing embodiments and features of the present disclosure.

FIG. 2 is a block diagram of an example electronic apparatus or system 200 for implementing embodiments and features of the present disclosure. By way of example, apparatus or system 200 may be used to implement client devices 102, 104 and/or server 130 of FIG. 1. The arrangement and number of components in system 200 is provided for purposes of illustration. Additional arrangements, number of components, and other modifications may be made, consistent with the present disclosure.

As shown in FIG. 2, system 200 may include one or more processors 210 for executing instructions. The one or more processors 210 may be single-core or multi-core processors based on the RISC, CISC, or any other computer instruction architecture known in the art. In some embodiments, the one or more processors 210 may include one or more graphics or other digital signal processors. System 200 may also include one or more input/output (I/O) devices 220. By way of example, I/O devices 220 may include physical keyboards, virtual touch-screen keyboards, mice, joysticks, styluses, etc. In certain embodiments, system 200 may also be capable of receiving input through gestures made by a user and/or a microphone (not shown) using, for example, speech-to-text and/or voice recognition applications.

As further illustrated in FIG. 2, system 200 may include one or more storage devices 230, 240 configured to store data and/or software instructions used by the one or more processors 210 to perform operations consistent with disclosed embodiments. For example, system 200 may include main memory 230 configured to store one or more software programs that performs functions or operations when executed by the one or more processors 210. By way of example, main memory 230 may include NOR or NAND flash memory devices, Read Only Memory (ROM) devices, Random Access Memory (RAM) devices, etc. System 200 may also include storage medium 240. By way of example, storage medium 240 may include hard drives, compact discs, blue ray discs, digital video discs, solid state drives, tape drives, RAID arrays, etc. Although FIG. 2 shows only one main memory 230 and one storage medium 240, system 200 may include any number of main memories 230 and storage mediums 240. Further, although FIG. 2 shows main memory 230 and storage medium 240 as part of system 200, main memory 230 and/or storage medium 240 may be located remotely and system 200 may be able to access main memory 230 and/or storage medium 240 via network 120.

System 200 may also include one or more display devices 250 for displaying data and graphical user interfaces. Display devices 250 may be implemented using devices or technology, such as a cathode ray tube (CRT) display, a liquid crystal display (LCD), a plasma display, a light emitting diode (LED) display, a touch screen type display, and/or any other type of display known in the art.

System 200 may also include one or more communications interfaces 260. Communications interface 260 may allow software and data to be transferred between system 200, network 120, client devices 102, 104, server 130, and/or other components. Examples of communications interface 260 may include a modem, a network interface (e.g., an Ethernet card), a communications port, a PCMCIA slot and card, etc. Communications interface 260 may transfer software and data in the form of signals, which may be electronic, electromagnetic, optical, or other signals capable of being received by communications interface 260. These signals may be provided to communications interface 260 via a communications path (not shown), which may be implemented using wire, cable, fiber optics, radio frequency ("RF") link, and/or other communications channels.

The disclosed embodiments are not limited to separate programs or computers configured to perform dedicated tasks. For example, server 130 may include main memory 230 that stores a single program or multiple programs. Additionally, server 130 may execute one or more programs located remotely from server 130. For example, server 130 may access one or more remote programs stored in main memory 230 included within a component, for example, client devices 102, 104 that, when executed, perform operations consistent with the disclosed embodiments. In some example embodiments, server 130 may be capable of accessing separate web server(s) or computing devices that generate, maintain, and provide web site(s), dictionary services, and/or translation services. Client devices 102, 104 may function in a manner similar to server 130 and vice-versa.

Figure 3:
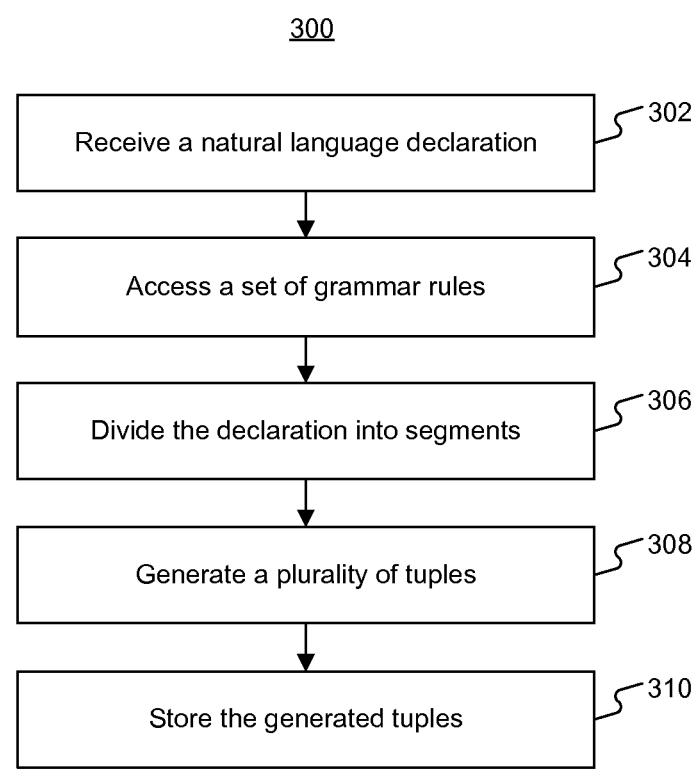
FIG. 3 is a flowchart of an example process for aggregating and storing information from natural language declarations.

FIG. 3 is a flowchart of an example process 300 that may be implemented for aggregating and storing information from natural language declarations. Process 300 may be implemented with one or more processors. In certain embodiments, process 300 may be implemented on server 130 without the need to access client devices 102, 104 and/or network 120. In other embodiments, process 300 may be implemented on client devices 102, 104 without the need to access server 130 and/or network 120. In further embodiments, process 300 may be implemented using one or more of client devices 102, 104, and/or server 130 communicating via network 120. The order and arrangement of steps in process 300 is provided for purposes of illustration. As will be appreciated from this disclosure, modifications may be made to process 300 by, for example, adding, combining, removing, and/or rearranging the steps for the process.

A natural language declaration may be a sentence, quote, phrase, question, etc., written or expressed in some form by a user. "Natural language" as used in this disclosure refers to how users may communicate with each other using spoken or written words in a language. By way of example, a sentence, such as, "I ate an apple" may represent a natural language declaration. Further, by way of example, a phrase such as "love yoghurt" or "go USA" may represent a natural language declaration. A natural language declaration may also include a paragraph or collection of sentences or phrases. A user may include a person, group, or an organization.

As shown in FIG. 3, process 300 may include a step 302 of receiving a natural language declaration. Receiving a natural language declaration in step 302 may include accessing or receiving a natural language declaration from a storage or database, such as a storage or database associated with system 100. In one example embodiment, receiving a natural language declaration may include retrieving the natural language declaration from data stored in main memory 230 or storage medium 240 of client devices 102, 104, and/or server 130. In another example embodiment, receiving a natural language declaration may include receiving the natural language declaration when a user 112, 114 inputs or provides the natural language declaration using one or more of the I/O devices 220 associated with one or more client devices 102, 104 and/or with server 130.

As further shown in FIG. 3, process 300 may include a step 304 of accessing a set of grammar rules. Grammar rules may refer to rules which may help identify and/or classify one or more words or phrases of a natural language declaration and associate contextual meaning to the words or phrases. By way of example, grammar rules based on the English language may help to determine whether a word or phrase used in the natural language declaration constitutes a noun, pronoun, verb, preposition, adjective, adverb, conjunction, subject, predicate, etc. It is also contemplated that grammar rules may help categorize words in the natural language declaration. For example, grammar rules may indicate that "banana," "apple," "carrot," "milk," etc. are food items and further that "banana" and "apple" are fruits, "carrot" is a vegetable, and "milk" is a dairy product. It will be appreciated from this disclosure that grammar rules may be specified to help associate words in a natural language declaration with contextual meanings.

By way of another example, grammar rules related to mathematics or scientific disciplines may help to assign meanings to symbols or scientific terms or provide context to the jargon used in a particular branch of mathematics or science. For example, grammar rules related to mathematics may help identify symbols such as "=" (equal), ">" (greater than), "<" (less than) etc. By way of another example, grammar rules related to mathematics may help recognize that shapes such as triangle, square, pentagon, and hexagon may include three, four, five, or six sides, respectively. It is also contemplated that grammar rules may be based on positional relationships of the words or phrases in the natural language declaration. For example, in a declaration containing a matrix of text and/or numbers with column headings, the column headings and/or the relative positions of the columns, for example, from the left to right, may be used to identify and/or classify the text and/or numbers.

Grammar rules may also include rules to allow interpretation of certain natural language terms. For example articles "a," or "an," may be associated with a quantity of "one." Similarly, for example, the words "double," "triple," or "quadruple" may be associated with a quantity of "two," "three," or "four," respectively. By way of another example, terms like "exercise," "running," "walking," "aerobics," etc. may be associated with a decrease in calories and/or increase in muscle mass.

Grammar rules may be stored in knowledge graph 140, tuples database 150, and/or any other storage associated with system 100. In some embodiments, grammar rules may be stored in an entity graph of known entities such as nouns (objects of things), verbs (activities), etc. For example, information indicating that certain nouns represent food items, fruits, or vegetables, may be stored in an entity graph. By way of another example, the entity graph may include information regarding nutritional content of various foods or calories burnt in a certain activity. Other commonly known information, for example, the number of days in a year, number of hours in a day, etc., may also be stored in an entity graph. Accessing grammar rules in step 304 may include processes similar to those described above with respect to, for example, step 302 of process 300 for accessing natural language declarations from a storage or database associated with system 100.

It is also contemplated that grammar rules may be learned. For example, process 300 may allow user 112, 114 to provide one or more natural language declarations and to identify and/or classify each word or groups of words in the one or more natural language declaration provided by user 112, 114. The natural language declarations provided by user 112, 114 may be used to train system 100 to classify and/or identify words or phrases. System 100 may derive grammar rules based on the classifications provided by user 112, 114 and store the grammar rules in knowledge graph 140, tuples database 150, or any other storage associated with system 100.

Referring again to FIG. 3, process 300 may also include a step 306 of dividing the natural language declaration into segments. A segment may constitute a data item represented by one word or groups of words selected from the natural language declaration. Segments in a natural language declaration may be identified using classifications based on grammar rules. By way of example, classifications based on English language grammar rules, may be used to divide the natural language declaration into parts of speech, for example, nouns, pronouns, verbs, etc. For example, the natural language declaration "I ate a banana yesterday" may be divided into five portions, the pronoun "I," the verb "ate," the noun "banana," the article "a," and the date indicator "yesterday." Further, grammar rules may be used to interpret one or more of these portions and associate contextual meanings with them to generate segments corresponding to the natural language declaration. For example, the article "a" may be identified as an indicator of the number of bananas that the user ate and may be represented by a segment "one." By way of another example, the word "yesterday" may be interpreted with respect to a date on which the declaration was made. Thus, for example, if user 112, 114 made the declaration on Jun. 15, 2014, the word "yesterday" may be represented by a segment "20140614" indicating that the user ate the banana on Jun. 14, 2014.

Natural language declarations may be divided into segments based on grammar rules in many other ways. For example, a list or matrix of text or numbers may be divided based on the separator symbol separating the text or numbers. Thus, for example, a list of text or numbers separated by commas, tabs, or spaces may be divided into segments consisting of the text or numbers between a pair of commas, tabs, or spaces. Similarly, for example, a matrix of numbers or text may be divided into segments based on the row and column position of the numbers or text in the matrix.

By way of another example, the word "hexagon" may be represented by segments characterizing the geometric shape based on mathematical grammar rules. Thus, the word hexagon may be represented by segments including, for example, "shape," "polygon," "regular," "six-sided," etc.

As shown in FIG. 3, process 300 may also include a step 308 of generating a plurality of tuples. A tuple, as used in this disclosure, consists of two or more segments stored in association with each other. In some embodiments, triples may be generated based on the segments of a natural language declaration. A triple, as used in this disclosure is a tuple, which consists of three segments. Tuples or triples may be generated by selecting one or more of the segments corresponding to a natural language declaration. A tuple may also include segments such as labels, and/or segments representing characteristics of a segment included in the tuple. Characteristics of segments may be derived from the grammar rules used to divide the natural language declaration into segments. In some embodiments, characteristics of segments may be obtained from an entity graph. By way of example, the natural language declaration "I ate a banana yesterday" provided by a user "XYZ" may be represented by the following triples: "XYZ/action-eat/label 1," "label 1/food/banana," "label 1/quantity/1," and "label 1/date/20140614." A segment "label 1" may be selected to be a part of each triple corresponding to a particular natural language declaration, thereby helping to identify triples associated with that particular natural language declaration. In some embodiments, the user identifier such as "XYZ" may serve the same function as a label. The number of triples generated for different natural language declarations may be different and may depend on the amount of information included in each natural language declaration and/or the amount of information derived from grammar rules or entity graphs used to process the natural language declaration.

In some embodiments, in addition to tuples related to the natural language declaration, process 300 may generate personal tuples based on a user's profile information or other social graph information associated with user 112, 114. For example, personal triples may include three data items, at least one of which may comprise, for example, gender, age, physical characteristics, hobbies, and/or interests of the user. Personal triples may be generated from natural language declarations made by user 112, 114, for example, in emails, search queries, blogs, personal electronic diaries or journals, information in a profile of user 112, 114, or information including photos, music, or other hobbies and interests shared by user 112, 114 on social media. By way of example, personal triples for a user "XYZ" may include "XYZ/age/28," "XYZ/gender/male," "XYZ/hobby/photography," etc.

Users 112, 114 may be provided with an opportunity to control whether the disclosed systems or methods collect user information (e.g., information about a user's social network, social actions or activities, profession, a user's preferences, or a user's current location), or to control whether and/or how to receive natural language declarations that may be more relevant to user 112, 114. In addition, certain data may be treated in one or more ways before it is stored or used, so that personally identifiable information is removed. For example, a user's identity may be treated so that no personally identifiable information can be determined for user 112, 114, or a user's geographic location may be generalized where location information is obtained (such as to a city, ZIP code, or state level), so that a particular location of user 112, 114 cannot be determined. Thus, user 112, 114 may have control over how information is collected about user 112, 114 and what information is stored in personal triples using the disclosed systems and methods.

Process 300 may also include a step 310 of storing the generated tuples. In some embodiments, tuples may be stored, in association with user 112, 114 who provided the natural language declaration, in tuples database 150. In other embodiments, tuples may be stored in knowledge graph 140 or in any other database or storage associated with system 100. In some embodiments tuples may be stored in separate databases associated with system 100 and an association table may be used to link the tuples to a user 112, 114.

Figure 4:
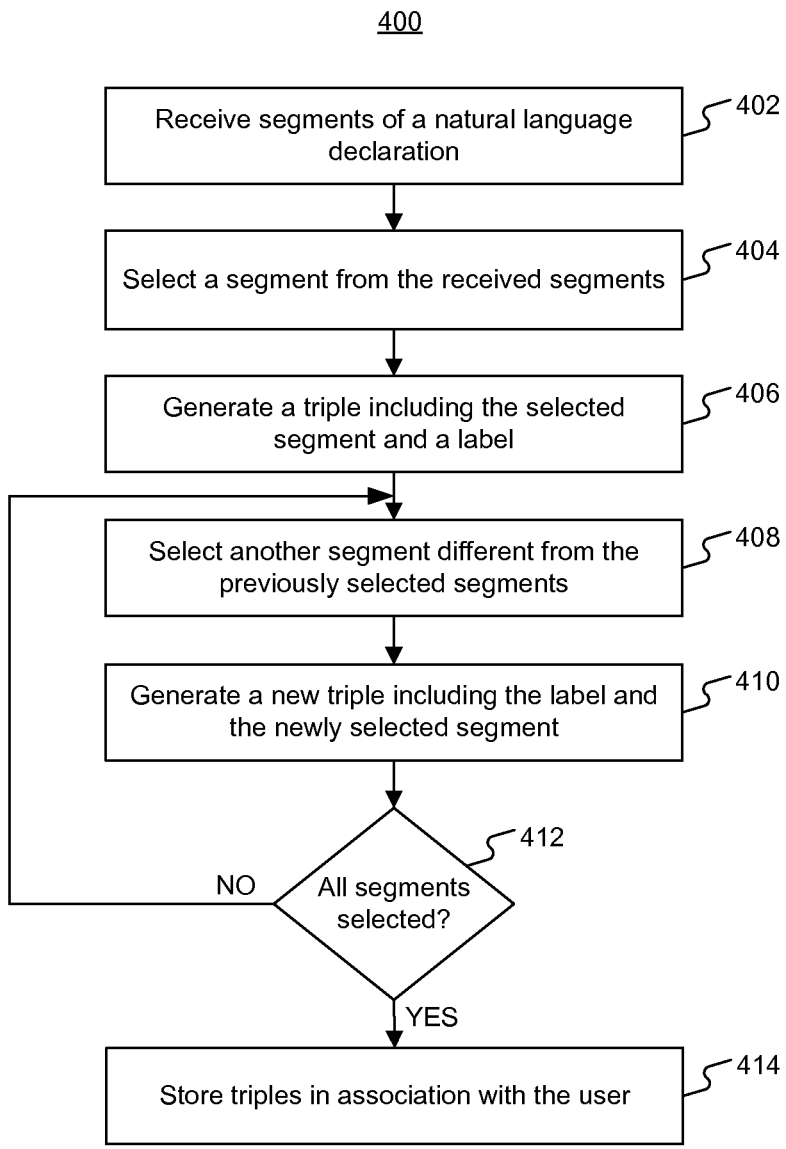
FIG. 4 is a flowchart of an example process for generating and storing structured tuples derived from natural language declarations.

FIG. 4 is a flowchart of an example process 400, consistent with embodiments of the present disclosure. As further described below, the example process 400 of FIG. 4 may be implemented for generating triples from a natural language declaration. Process 400 may be implemented with one or more processors. In certain embodiments, process 400 may be implemented on server 130 without the need to access client devices 102, 104 and/or network 120. In other embodiments, process 400 may be implemented on client devices 102, 104 without the need to access server 130 and/or network 120. In further embodiments, process 400 may be implemented using one or more of client devices 102, 104, and/or server 130 communicating via network 120. The order and arrangement of steps in process 400 is provided for purposes of illustration. As will be appreciated from this disclosure, modifications may be made to process 400 by, for example, adding, combining, removing, and/or rearranging the steps for the process.

As shown in FIG. 4, process 400 may include a step 402 of receiving segments of a natural language declaration. In some embodiments, client device 102, 104 may receive the segments from server 130 or vice-versa. Receiving segments, in step 402 of process 400, may include processes similar to those described above with respect to, for example, step 302 of process 300 for accessing a natural language declaration from a storage or database associated with system 100.

Process 400 may also include a step 404 of selecting a segment from the segments received in, for example, step 402. Selecting the segment may include arbitrarily selecting a segment from the list of segments associated with the natural language declaration. Selecting the segment may also include selecting a segment based on a relative ordering or ranking of the segments associated with the natural language declaration. For example, grammar rules may be used to rank or order the segments associated with the natural language declaration. In some embodiments, for example, a word identified as a "subject," that is, representing an actor in the natural language declaration may be ranked higher than a word identified as a "verb," which represents an action performed by the actor. Similarly the "verb" may be ranked higher than a noun identified as a "predicate," on which or related to which the action may be performed by the actor. Other segments of the natural language declaration may be assigned lower rankings compared to the subject, verb, and/or predicate. In other embodiments, the segments of a natural language declaration may be ranked based on their position in the natural language declaration. It will be appreciated from this disclosure that a variety of grammar rules may be provided for ranking the segments associated with a natural language declaration. By way of example, in the natural language declaration "I ate a banana yesterday," the subject "I" may be represented by a segment "XYZ" corresponding to an identifier of the declarant and may have a higher rank than the verb "ate" or the predicate "banana." Further, the segment "one" corresponding to the article "a" and the segment "20140614" corresponding to "yesterday" may be ranked lower than the subject, verb, and predicate. In this example, in step 404, the segment "XYZ" may be selected from among all the segments corresponding to the natural language declaration "I ate a banana yesterday."

Process 400 may also include a step 406 of generating a triple, which may include the selected segment and two other segments. In some embodiments, one of the other two segments may be a label, for example, "label 1," which may be used to associate or relate triples corresponding to a particular natural language declaration. It is contemplated, however, that in some embodiments, the user identifier, for example, "XYZ" may perform the function of a label. The remaining segment of the triple may be a segment selected from the segments associated with the natural language declaration but may be different from the previously selected segments. Thus, for example, the previously unselected segment corresponding to the verb "eat" may be selected as a second segment for generating the triple "XYZ/action-eat/label 1," corresponding to the natural language declaration "I ate a banana yesterday."

Process 400 may also include a step 408 of selecting another segment different from the previously selected segments. Selecting another segment may include selecting a data item not included in previously generated triples, for example, the triple generated in step 406. Selecting another segment may include processes similar to those described with respect to, for example, step 404.

Process 400 may also include a step 410 of generating a new triple, which may include a previously unselected segment of the natural language declaration, and/or the label used to generate the triple, for example, in step 406. Additionally or alternatively, some of the segments of the triple may include segments representing characteristics of the previously selected segment, as determined by the grammar rules used to generate the segments. For example, a new triple such as ""label 1/food/banana," may be generated in this step. The data item "label 1" may be the same as the label used in the triple "XYZ/action-eat/label 1" generated, for example, in step 406. The previously unselected data item "banana," corresponding to the example natural language declaration "I ate a banana yesterday," may be selected for generation of the new triple. Further, grammar rules, or information from knowledge graph 150, entity graph, or database associated with system 100 may be used to determine that "banana" is a "food." The characteristic of "banana" namely "food" may be selected as a segment to generate the new triple "label 1/food/banana" in step 410. As can be seen in this example, "label 1" relates the triple "label 1/food/banana" generated, for example, in step 410 to the triple "XYZ/action-eat/label 1" generated, for example, in step 406 because the data item "label 1" occurs in both triples.

Process 400 may also include a step 412 of determining whether all segments of the natural language declaration have been selected for generation of triples. When it is determined in step 412 that all segments have not been selected for generation of triples (Step 412: No), process 400 may return to step 408 to select another segment different from the previously selected segments. Process 400 may continue from step 408 through steps 410 and 412. When it is determined in step 412, however, that all the segments received in, for example, step 402 have been selected for the generation of triples (Step 412: Yes), process 400 may proceed to step 414 of storing the triples in association with user 112, 114. Storing triples in step 414 may include processes similar to those described above with respect to, for example, step 310 of process 300.

Figure 5:
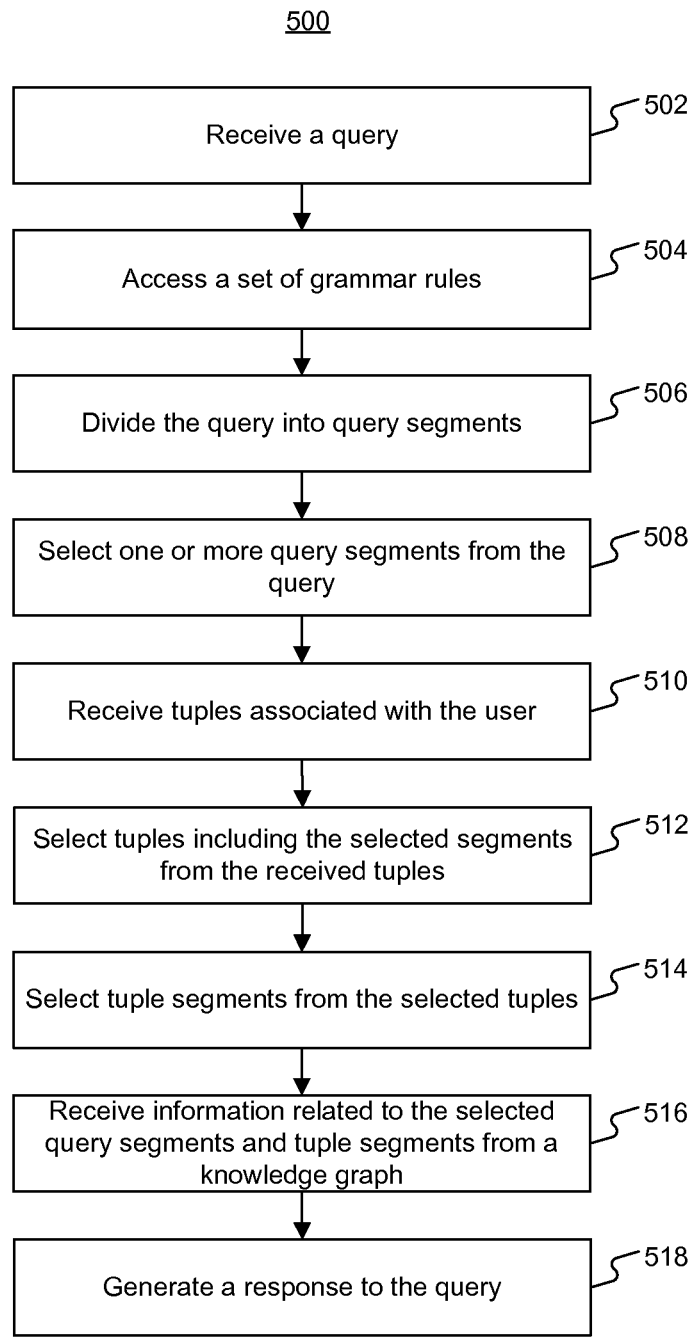
FIG. 5 is a flowchart of an example process for generating responses to a natural language query.

FIG. 5 is a flowchart of an example process 500, consistent with embodiments of the present disclosure. As further described below, the example process 500 of FIG. 5 may be implemented for generating inferences in response to a natural language query or declaration. Process 500 may be implemented with one or more processors. In certain embodiments, process 500 may be implemented on server 130 without the need to access client devices 102, 104 and/or network 120. In other embodiments, process 500 may be implemented on client devices 102, 104 without the need to access server 130 and/or network 120. In further embodiments, process 500 may be implemented using one or more of client devices 102, 104, and/or server 130 communicating via network 120. The order and arrangement of steps in process 500 is provided for purposes of illustration. As will be appreciated from this disclosure, modifications may be made to process 500 by, for example, adding, combining, removing, and/or rearranging the steps for the process.

As shown in FIG. 5, process 500 may include a step 502 of receiving a natural language query or declaration. A natural language query may take many different forms. In some embodiments, a natural language query may be identified as a natural language declaration that ends with a question mark. By way of example, such a natural language query may include text such as "Am I eating enough potassium?" The presence of the symbol "?" may identify the natural language declaration as a natural language query. In other embodiments, specific words in the natural language declaration may be used to determine whether it is a query. For example, question words, such as, "who," "what," "why," "when," "where," "how," etc. may indicate that the natural language declaration is a natural language query. It is contemplated that grammar rules may be used to determine whether a natural language declaration may be a natural language query. For example, a natural language declaration such as "Can I eat more apples" may be determined to be a natural language query by detecting that the words "Can I" precede the verb "eat." It will be recognized from this disclosure that many other types of grammar rules, for example, based on the usage, position, or contextual meaning of the words in the natural language declaration may be used to identify a natural language query.

In some embodiments, client device 102, 104 may receive the natural language query from a user 112, 114 of client device 102, 104. A user may input the natural language query into client device 102, 104, using one or more I/O devices 220 associated with client device 102, 104. In other embodiments, client device 102, 104 may receive the natural language query from server 130 or vice-versa. Receiving a natural language query, in step 502 of process 500, may include processes similar to those described above, for example, with respect to step 302 of process 300.

Process 500 may also include a step 504 of accessing grammar rules. As discussed above, grammar rules may be used to determine whether a natural language declaration is a natural language query. Further, grammar rules may be used to identify and classify various segments of the natural language query. Accessing grammar rules, in step 504 of process 500, may include processes similar to those described above, for example, with respect to step 304 of process 300.

Process 500 may also include a step 506 of dividing the natural language query into query segments. Dividing the natural language query into query segments, in step 506 of process 500, may include processes similar to those described above, for example, with respect to step 306 of process 300.

Process 500 may also include a step 508 of selecting one or more query segments from the query segments corresponding to the natural language query. Selecting a query segment may include arbitrarily selecting the query segment from the list of query segments corresponding to the natural language query. Selecting a query segment may also include selecting the query segment based on a relative ordering or ranking of the query segments using processes similar to those described above, for example, with respect to step 306 of process 300. By way of example, in the natural language declaration "Am I eating enough potassium?," the subject "I" may have a higher rank compared to the verb "eat," which may have a higher rank than the predicate "potassium." Further, for example, the subject "I" may be represented by a query segment "XYZ" corresponding to an identifier of the declarant or user who provided the natural language query. In this example, "XYZ" and "eat" may be selected as the query segments in step 508.

As shown in FIG. 5, process 500 may include a step 510 of receiving tuples associated with the user. Receiving tuples in step 510 may include accessing or receiving tuples from any storage or database associated with system 100. In one example embodiment, receiving tuples may include retrieving the tuples from data stored in main memory 230 or storage medium 240 of client devices 102, 104, and/or server 130. In another example embodiment, receiving tuples may include accessing the tuples stored in association with the user in tuples database 150. Receiving tuples, in step 510 of process 500, may include processes similar to those described above with respect to, for example, step 304 of process 300 of accessing grammar rules from a storage or database associated with system 100.

Process 500 may also include a step 512 of selecting tuples related to the query segments selected in, for example, step 508. Selecting tuples may include comparing the selected query segments with tuple segments included in the tuples associated with user 112, 114. In some embodiments, a vector distance or cosine distance between the selected query segments and the tuples associated with user 112, 114 may be used to identify tuples related to the selected query segments. Selecting tuples may include selecting one or more tuples, having values of vector distance or cosine distance less than a threshold distance, from the selected query segments.

For example, in step 508, query segments "eat" and "potassium" may be selected from the natural language query "Am I eating enough potassium?" In step 512, tuples associated with user "XYZ" related to "eat" may be selected from the tuples stored in association with user "XYZ." For example, the triples "XYZ/action-eat/label 1" and "label 1/food/banana" may be selected from the tuples associated with user "XYZ."

The process of selecting tuples related to more than one selected query segment may occur sequentially or simultaneously. For example, in a sequential process, tuples having vector or cosine distance values lower than a threshold distance from a first query segment may be selected. This process of selecting tuples may be repeated for each of the selected query segments. The totality of the selected tuples related to each of the selected query segments may form the set of selected tuples. In other embodiments, vector or cosine distances between all selected query segments and all tuples associated with user 114, 116 may be computed and tuples having vector or cosine distances below a threshold distance may be selected from the entire set of tuples associated with user 114, 116 for further processing.

As shown in FIG. 5, process 500 may include a step 514 of selecting tuple segments from the tuples selected in, for example, step 512. Selecting tuple segments may include selecting one or more segments from each of the selected tuples. In some embodiments, the tuple segments may be selected so that the selected tuple segments are different from the selected query segments. Selecting tuple segments, in step 514 of process 500, may include processes similar to those described above, for example, with respect to step 404 of process 400. By way of example, the tuple segment "banana" from the triple "label 1/food/banana" associated with user "XYZ" may be selected in step 514.

Process 500 may include a step 516 of receiving information related to the selected query segments and/or the selected tuple segments from a knowledge graph or entity graph. Receiving information may include receiving first information related to the selected query segments and receiving second information related to the selected tuple segments from a knowledge graph. Knowledge graph 140 and/or any entity graph associated with system 100 may also store information in the form of tuples. First and second information may each include one or more knowledge graph tuples associated with the selected query segments and selected tuple segments respectively. Identifying knowledge graph tuples and/or entity graph tuples may include processes similar to those described above with respect to, for example, step 512 of process 500 for computing vector distances or cosine distances.

Thus, for example, first information related to query segment "potassium" may be received from knowledge graph 140. For example, triples such as "potassium/min_daily_amount/1.5 g" and "potassium/max_daily_amount/2.3 g" which provide information about the USDA recommended amount of potassium may be obtained as triples related to the query segment "potassium." Similarly, second information related to tuple segment "banana" may be obtained from a knowledge graph tuple or an entity graph tuple such as "banana/potassium/422 mg." Third information may be obtained from previously unselected tuples associated with user "XYZ." For example, triples "label 1/quantity/1," and "label 1/date/20140614" associated with user "XYZ" may indicate the number of bananas and, therefore, the amount of potassium consumed by user "XYZ" in one day.

As shown in FIG. 5, process 500 may also include a step 518 of generating a response to the natural language query. Generating the response may include selecting data items from the received information comprising knowledge graph tuples, entity graph tuples, and/or tuples associated with user 114, 116. The one or more selected data items may be used to generate a response to the natural language query.

For example, tuple segments selected from the knowledge graph tuples "potassium/min_daily_amount/1.5 g," "potassium/max_daily_amount/2.3 g," and "banana/potassium/422 mg" combined with the tuples "label 1/quantity/1," and "label 1/date/20140614" associated with user "XYZ" may be used to infer that user "XYZ" has only eaten one banana yesterday and therefore only consumed 422 mg of potassium, which is much smaller than the minimum recommended amount of potassium of 1.5 g. Thus, a response indicating to user "XYZ" that user "XYZ" should eat more potassium may be generated in step 518 of process 500.

Figure 6:
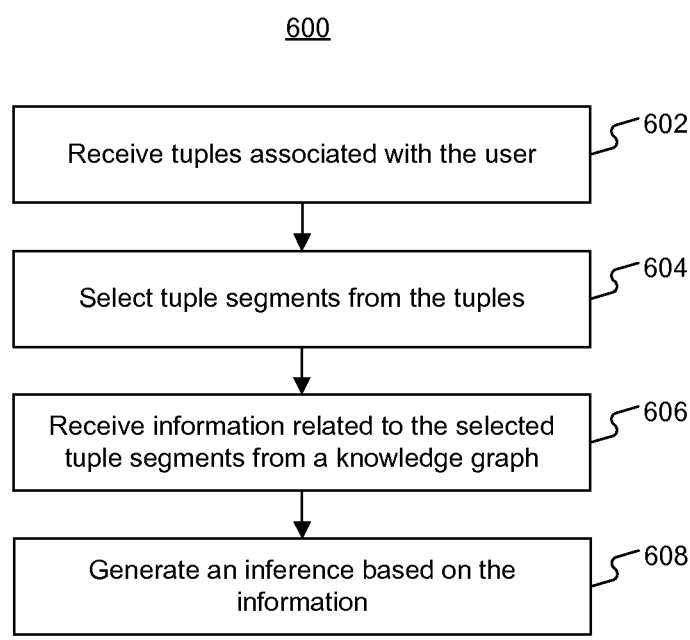
FIG. 6 is a flowchart of an example process for generating pushed inferences based on tuples associated with a user.

FIG. 6 is a flowchart of an example process 600, consistent with embodiments of the present disclosure. As further described below, the example process 600 of FIG. 6 may be implemented for generating pushed inferences based on tuples associated with user 112, 114. "Pushed inferences" as used in this disclosure refers to inferences generated without receiving any natural language query from users 112, 114. Process 600 may be implemented with one or more processors. In certain embodiments, process 600 may be implemented on server 130 without the need to access client devices 102, 104 and/or network 120. In other embodiments, process 600 may be implemented on client devices 102, 104 without the need to access server 130 and/or network 120. In further embodiments, process 600 may be implemented using one or more of client devices 102, 104, and/or server 130 communicating via network 120. The order and arrangement of steps in process 600 is provided for purposes of illustration. As will be appreciated from this disclosure, modifications may be made to process 600 by, for example, adding, combining, removing, and/or rearranging the steps for the process. Process 600 may be performed as an offline process on a periodic basis. Alternatively, process 600 may be performed each time one of client devices 102, 104 or server 130 receives a natural language declaration from users 112, 114. Additionally, or alternatively, process 600 may be performed when initiated by users 112, 114 and/or a server administrator.

As shown in FIG. 6, process 600 may include a step 602 of receiving tuples associated with the user. Receiving tuples in step 602 may include accessing or receiving tuples from any storage or database associated with system 100. In one example embodiment, receiving tuples may include retrieving the tuples from data stored in main memory 230 or storage medium 240 of client devices 102, 104, and/or server 130. In another example embodiment, receiving tuples may include accessing the tuples stored in association with the user in tuples database 150. Receiving tuples, in step 510 of process 600, may include processes similar to those described above with respect to, for example, step 304 of process 300 of accessing grammar rules from a storage or database associated with system 100.

As shown in FIG. 6, process 600 may include a step 604 of selecting tuple segments from the tuples received in, for example, step 602. Selecting tuple segments may include selecting one or more segments from each of the received tuples. Selecting tuple segments, in step 604 of process 600, may include processes similar to those described above, for example, with respect to step 404 of process 400. By way of example, the tuple segment "banana" from the triple "label 1/food/banana" associated with user "XYZ" may be selected in step 602.

Process 600 may include a step 606 of receiving information related to the selected tuple segments from a knowledge graph or entity graph. Knowledge graph 140 and/or any entity graph associated with system 100 may also store information in the form of tuples. Information received from knowledge grapn 140 and/or entity graph may include one or more knowledge graph tuples or entity graph tuples associated with the selected tuple segments. Identifying knowledge graph tuples and/or entity graph tuples may include processes similar to those described above with respect to, for example, step 512 of process 500 for computing vector distances or cosine distances.

Thus, for example, first information related to tuple segment "banana" may be received from knowledge graph 140. For example, triples such as "banana/potassium/422 mg," which provides information regarding the amount of potassium in a banana may be obtained from knowledge graph 140. Additionally triples such as "potassium/min_daily_amount/1.5 g" and "potassium/max_daily_amount/2.3 g," which provide information about the USDA recommended amount of potassium may be obtained as triples related to the query segment "potassium." Second information may be obtained from other tuples associated with user "XYZ." For example, triples "label 1/quantity/1," and "label 1/date/20140614" associated with user "XYZ" may indicate the number of bananas and, therefore, the amount of potassium consumed by user "XYZ" in one day.

As shown in FIG. 6, process 600 may also include a step 608 of generating an inference based on the tuples associated with users 112, 114. Generating the inference may include selecting data items from the received information comprising knowledge graph tuples, entity graph tuples, and/or tuples associated with user 114, 116. The one or more selected data items may be used to generate a response to the natural language query.

For example, tuple segments selected from the knowledge graph tuples "potassium/min_daily_amount/1.5 g," "potassium/max_daily_amount/2.3 g," and "banana/potassium/422 mg" combined with the tuples "label 1/quantity/1," and "label 1/date/20140614" associated with user "XYZ" may be used to infer that user "XYZ" has only eaten one banana yesterday and therefore only consumed 422 mg of potassium, which is much smaller than the minimum recommended amount of potassium of 1.5 g. Thus, an inference indicating to user "XYZ" that user "XYZ" should eat more potassium may be generated in step 508 of process 500.

In another example embodiment, tuples related to other users may be obtained from knowledge graph 140. For example, tuples indicating how many bananas were eaten by other users in New York could be used to determine an average amount of potassium being consumed by other users in New York. The amount of potassium consumed by user "XYZ," for example, 422 mg may be compared with the average amount of potassium to generate an inference that user "XYZ" is eating less potassium compared to other users in New York.

Figure 7:
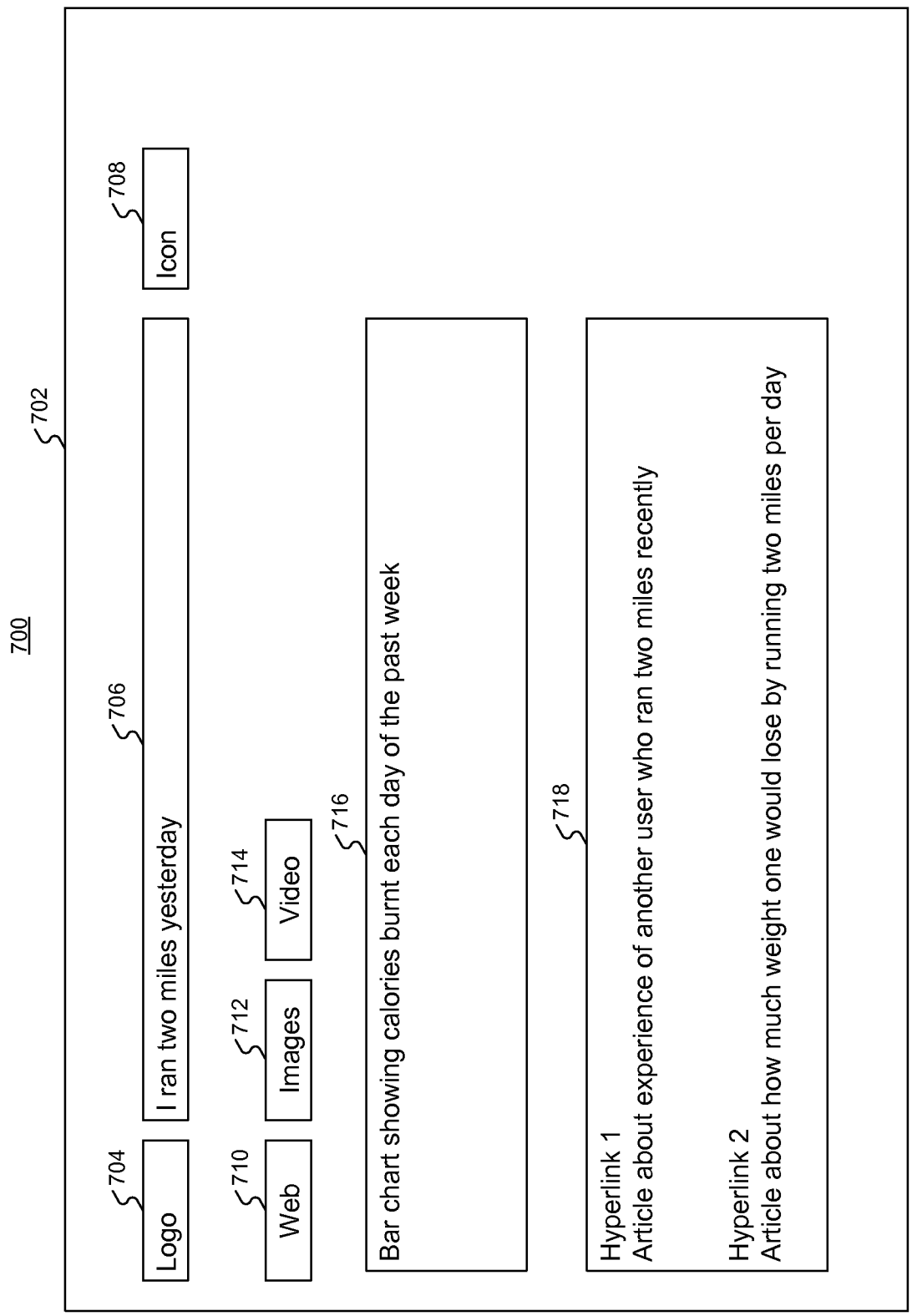
FIG. 7 illustrates an example user interface for presenting information in response to a query.

FIG. 7 illustrates an example user interface 700. User interface 700 may present one or more responses to a natural language query on display device 250. As illustrated in FIG. 7, user interface 700 may include a display window 702. As further illustrated in FIG. 7, display window 702 may include a logo portion 704 for displaying a logo, a natural language declaration or query input portion 706 and an icon portion 708. Logo portion 704 may display a logo related to a provider of the user interface or a provider of system 100. Natural language declaration or query input portion 706 may allow a user 112, 114 to enter a natural language query or declaration. In some embodiments, portion 706 may take the form of a text box. A user 112, 114 may be able to enter a natural language declaration or query in portion 706 using conventional methods (e.g., data entry, data transfer, data uploading, etc.). Users 112, 114 may enter a natural language declaration or query using one or more of input/output devices 220 associated with client devices 102, 104 and/or server 130. By way of example, as illustrated in FIG. 7, natural language declaration or query portion 706 displays the natural language declaration "I ran two miles yesterday."

Icon portion 706 may display an icon indicating to user 112, 114 that user 112, 114 may request a response to the natural language declaration or query in portion 706 by activating icon portion 708. For example, icon portion 708 may display an icon of a magnifying glass to indicate that activating icon portion 708 will cause user interface 700 to display information related to the natural language declaration or query entered in portion 706. Users 112, 114 may activate icon portion 708 using one or more of input/output devices 220.

As also illustrated in FIG. 7, display window 702 may additionally or alternatively include links 710, 712, 714. Links 710, 712, 714 may enable users 112, 114 to filter the responses generated for the natural language query. In some example embodiments, as illustrated in FIG. 7, link 710 may allow users to filter the responses to show only web sites. In other example embodiments, as illustrated in FIG. 7, link 712 may allow users to only display images corresponding to the natural language declaration or query entered in portion 706. In yet other example embodiments, as illustrated in FIG. 7, link 714 may allow users to only display videos corresponding to the natural language declaration or query entered in portion 706.

As further illustrated in FIG. 7, display window 702 may include a display portion 716, which may display images showing charts and graphs in response to the natural language declaration or query entered in portion 706. For example, as illustrated in FIG. 7, display portion 716 may display a bar chart showing the number of calories burnt by user 112, 114 on each day of the week based on the exercise regimen followed by the user. The bar chart may include a data item showing the amount of calories burnt by the user the previous day by running two miles.

Display window 702 may also include a display portion 716 which may display a set of links to articles, blogs, reports, messages, comments, and/or other content items related to the natural language query entered in portion 706. For example, as illustrated in FIG. 7, hyperlink 1 may be a universal resource locator ("URL" or other pointer to an article about the experience of another user when that user ran two miles. Similarly, hyperlink 2 may be a URL or pointer to another article indicating how much weight user 112, 116 may lose by running two miles each day. Although display portion 716 displays only two links in FIG. 7, display portion 716 may display any number of links. In certain embodiments, display portion 716 may initially display only one or two links and may include a scroll bar or other graphical widget to allow users 112, 114 to scroll the text to see additional links not initially displayed in display portion 716. Although FIG. 7 illustrates a particular arrangement of display portions 704, 706, 708, 710, 712, 714, and 716 in display window 702, display portions 704, 706, 708, 710, 712, 714, and 716 may be arranged in any manner in display window 702. It is also contemplated that not all of 704, 706, 708, 710, 712, 714, and 716 may be included on every display window 702 displayed to users 112, 114.

Other embodiments of the disclosure will be apparent to those skilled in the art from consideration of the specification and practice of the embodiments disclosed herein. It is intended that the specification and examples be considered as exemplary only, with a true scope and spirit of the invention and example embodiments being indicated by the following claims.

What is claimed is:

1. A computerized system for responding to a user query, comprising:
    a communications interface;
    a memory device that stores a set of instructions; and
    one or more processors that execute the set of instructions to:
        receive, via the communications interface, a natural language declaration from a client device of a user;
        generate, based on a first segment of the natural language declaration, a first tuple that includes:
            a first tuple segment that is based on the first segment of the natural language declaration, and
            a label for the natural language declaration;
        generate, based on a second segment of the natural language declaration, a second tuple that includes:
            a second tuple segment that is based on the second segment of the natural language declaration, wherein the second tuple segment is not included in the first tuple, and
            the label for the natural language declaration, wherein the label relates the first tuple to the second tuple;
        store, in at least one computer readable medium, the first tuple and the second tuple in association with the user;
        receive, via the communications interface, a natural language query from the client device of the user; and
        responsive to the natural language query:
            generate an inference based on at least the first tuple, the second tuple, and additional information determined from an additional resource, wherein the inference is generated based on the first tuple and the second tuple based on the first tuple and the second tuple being related by the label, and wherein the inference includes information personal to the user; and
            provide, via the communications interface, the inference to the client device for presentation to the user.

2. The computerized system of claim 1, wherein in executing the instructions to generate the inference, one or more of the processors execute the instructions to:
    determine first information, of the additional information, based on the first information being associated with the first tuple segment;
    determine second information, of the additional information, based on the second information being associated with the second tuple segment; and
    generate the inference based on both the first information and the second information.

3. The computerized system of claim 1, wherein in executing the instructions, one or more of the processors are further to:
    receive, via the communications interface, an additional natural language declaration from the client device of the user;
    generate at least one additional tuple based on the additional natural language declaration; and
    store, in the at least one computer readable medium, the at least one additional tuple in association with the user.

4. The computerized system of claim 3, wherein in executing the instructions to provide the inference, one or more of the processors execute the instructions to:
provide the inference in response to receiving the additional natural language declaration.

5. The computerized system of claim 3, wherein in executing the instructions to generate the inference, one or more of the processors execute the instructions to:
generate the inference further based on the at least one additional tuple stored in association with the user.

6. The computerized system of claim 5, wherein in executing the instructions to generate the inference, one or more of the processors execute the instructions to:
determine first information, of the additional information, based on the first information being associated with the first tuple segment;
determine second information, of the additional information, based on the second information being associated with the second tuple segment;
determine third information, of the additional information, based on the third information being associated with a third tuple segment of the at least one additional tuple; and
generate the inference based on the first information, the second information, and the third information.

7. The computerized system of claim 1, wherein the first tuple is a triple that includes the first tuple segment, the label, and a first tuple additional segment.

8. A method performed by one or more processors, comprising:
receiving, via a communications interface, a natural language declaration from a client device of the user;
generating, based on a first segment of the natural language declaration, a first tuple that includes:
a first tuple segment that is based on the first segment of the natural language declaration, and
a label for the natural language declaration;
generating, based on a second segment of the natural language declaration, a second tuple that includes:
a second tuple segment that is based on the second segment of the natural language declaration, wherein the second tuple segment is not included in the first tuple, and
the label for the natural language declaration, wherein the label relates the first tuple to the second tuple;
storing, in at least one computer readable medium, the first tuple and the second tuple in association with the user;
receiving, via the communications interface, a natural language query from the client device of the user;
generating an inference based on at least the first tuple, the second tuple, and additional information determined from an additional resource, wherein the inference is generated based on the first tuple and the second tuple based on the first tuple and the second tuple being related by the label, and wherein the inference includes information personal to the user; and
providing, responsive to the natural language query and via the communications interface, the inference to the client device for presentation to the user.

9. The method of claim 8, wherein generating the inference comprises:
determining first information, of the additional information, based on the first information being associated with the first tuple segment;
determining second information, of the additional information, based on the second information being associated with the second tuple segment; and
generating the inference based on both the first information and the second information.

10. The method of claim 8, further comprising
receiving, via the communications interface, an additional natural language declaration from the client device of the user;
generating at least one additional tuple based on the additional natural language declaration; and
storing, in the at least one computer readable medium, the at least one additional tuple in association with the user.

11. The method of claim 10, wherein providing the inference comprises:
providing the inference in response to receiving the additional natural language declaration.

12. The method of claim 10, wherein generating the inference is further based on the at least one additional tuple stored in association with the user.

13. The method of claim 12, wherein generating the inference comprises:
determining first information, of the additional information, based on the first information being associated with the first tuple segment;
determining second information, of the additional information, based on the second information being associated with the second tuple segment;
determining third information, of the additional information, based on the third information being associated with a third tuple segment of the at least one additional tuple; and
generating the inference based on the first information, the second information, and the third information.

14. The method of claim 8, wherein the first tuple is a triple that includes the first tuple segment, the label, and a first tuple additional segment.

15. A method performed by one or more processors, comprising:
receiving, via a communications interface, at least one natural language declaration from a client device of the user;
generating at least a first tuple and a second tuple based on the at least one natural language declaration, wherein the first tuple is based on a first segment of the natural language declaration, wherein the second tuple is based on a second segment of the natural language declaration, and wherein the same natural language declaration is used to generate the first segment of the natural language declaration and the second segment of the natural language declaration;
storing, in at least one computer readable medium, the at least first tuple and second tuple in association with the user;
receiving, via the communications interface, a natural language query from the client device of the user; and
responsive to receiving the natural language query:
generating an inference, based on the at least first tuple and second tuple, and additional information, wherein generating the inference comprises:
determining first information, of the additional information, based on the first information being associated with a first segment of the at least first tuple;
determining second information, of the information, based on the second information being associated with a second segment of the at least second tuple; and generating the inference based on both the first information and the second information; and providing, via the communications interface, the inference to the client device for presentation to the user.

16. The method of claim 15, wherein the first tuple is a triple that includes the first tuple first segment, the first tuple second segment, and a first tuple third segment.

\* \* \* \* \*